United States Patent [19]

Ashcroft et al.

[11] Patent Number: 6,160,879
[45] Date of Patent: Dec. 12, 2000

[54] PRIVATE CIRCUIT PROVISION IN A TELECOMMUNICATIONS NETWORK

[75] Inventors: Peter Ashcroft, Elford; John C Tooze, Colchester, both of United Kingdom

[73] Assignee: British Telecommunications public limited company, London, United Kingdom

[21] Appl. No.: 09/029,931

[22] PCT Filed: Aug. 12, 1997

[86] PCT No.: PCT/GB97/02161

§ 371 Date: Mar. 10, 1998

§ 102(e) Date: Mar. 10, 1998

[87] PCT Pub. No.: WO98/08346

PCT Pub. Date: Feb. 26, 1998

[30] Foreign Application Priority Data

Aug. 16, 1996 [EP] European Pat. Off. .............. 96305989
Mar. 27, 1997 [EP] European Pat. Off. .............. 97302189
Apr. 15, 1997 [EP] European Pat. Off. ................ 9707639

[51] Int. Cl.⁷ ..................................................... H04M 3/42
[52] U.S. Cl. ........................................... 379/202; 379/203
[58] Field of Search ................................... 379/202, 204, 379/205, 201, 203

[56] References Cited

U.S. PATENT DOCUMENTS

| | | |
|---|---|---|
| 4,348,554 | 9/1982 | Asmuth . |
| 4,982,421 | 1/1991 | Kirsch et al. . |
| 5,065,392 | 11/1991 | Sibbitt et al. . |
| 5,185,782 | 2/1993 | Srinivasan . |
| 5,311,574 | 5/1994 | Livanos . |
| 5,353,339 | 10/1994 | Scobee . |
| 5,396,548 | 3/1995 | Bayel et al. .......................... 379/202 X |
| 5,483,588 | 1/1996 | Baton et al. .............................. 379/202 |
| 5,546,449 | 8/1996 | Hogan et al. ............................ 379/202 |
| 5,619,561 | 4/1997 | Reese .................................... 379/202 X |
| 5,654,961 | 8/1997 | Araujo et al. ............................ 379/202 |

FOREIGN PATENT DOCUMENTS

| | | |
|---|---|---|
| 0400879 A2 | 12/1990 | European Pat. Off. . |
| 0845913 A2 | 10/1997 | European Pat. Off. . |
| WO 92/00642 | 1/1992 | WIPO . |
| WO 98/08346 | 2/1998 | WIPO . |
| WO 98/08347 | 2/1998 | WIPO . |

OTHER PUBLICATIONS

Weihmayer et al, "Modeling Cooperative Agents for Customer Network Control Using Planning and Agent–Oriented Programming", Globecom 92, Dec. 6–9, 1992, vol. 1, pp. 537–543.

Bauer et al, Opening the Public Network to Customer Access and Control, IEEE International Conference on Communications BostonICC/89, Jun. 11–14, 1989, pp. 920–926.

Berman et al, "Customer Network Management and Control Services", ISSLS 86, Sep. 29–Oct. 3, 1986, Tokyo, Japan, pp. 94–98.

Atoui, "An Integrated Systems Design of the Intelligent Network", IEEE/ACM International Conference on Developing and Managing Expert System Programs, Sep. 30–Oct. 2, 1991, pp. 187–194.

Brosemer et al, "Virtual Networks: Past, Present and Future", IEEE Communications Magazine, 30 (1992) Mar. No. 3, New York, US, pp. 80–85.

*Primary Examiner*—Creighton Smith
*Attorney, Agent, or Firm*—Nixon & Vanderhye P.C.

[57] ABSTRACT

A telecommunications network includes local switches, main switches and access lines. A switching unit which takes the form of a computer with switching capability is connected to the local switch on a 30 channel ISDN link. In order to form a private circuit between two access lines, the following operations are performed. At local switches, access line are physically connected to free local switch lines. At each of the local switches, an engineer uses the free local switch line which has just been connected to an access line to make a call to the switching unit. The switching unit captures the CLI of this local switch line. The engineer then enters an identifier for the private circuit which is to be formed and instructs the switching unit to form a private circuit. The switching unit then calls these two free local switch lines and then forms the private circuit by connecting the local switch lines together within itself.

9 Claims, 9 Drawing Sheets

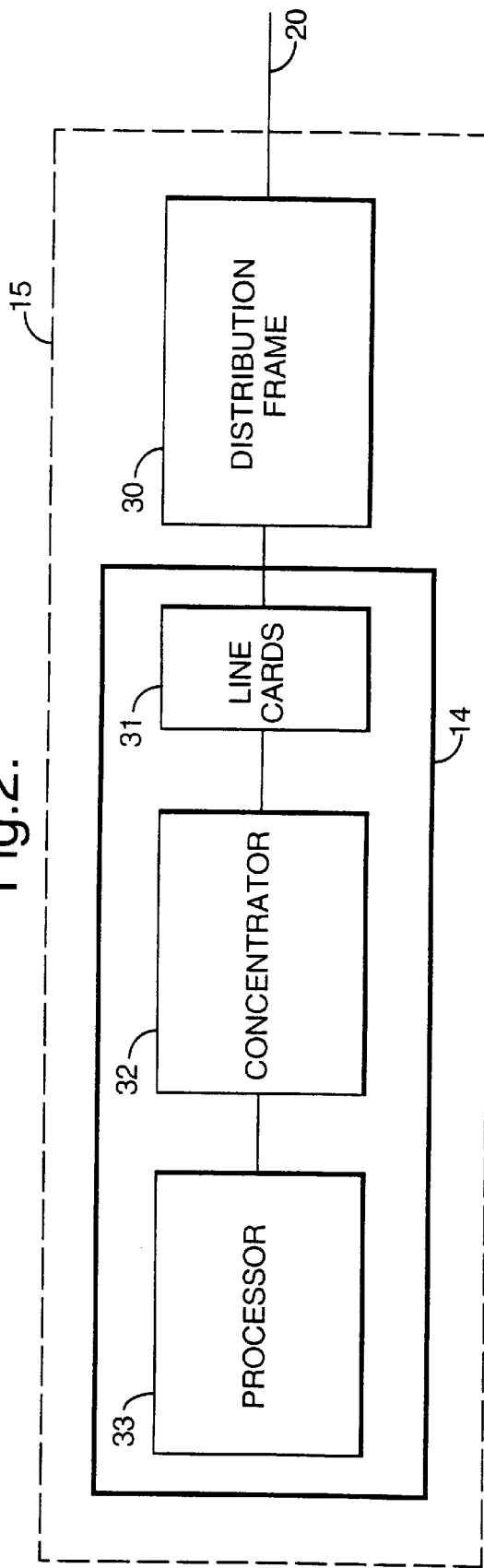
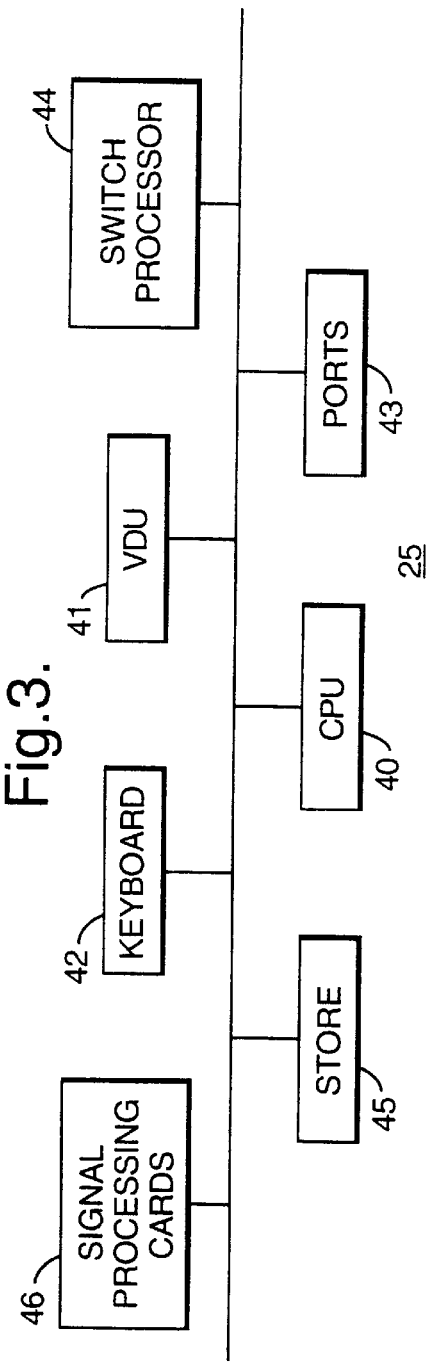

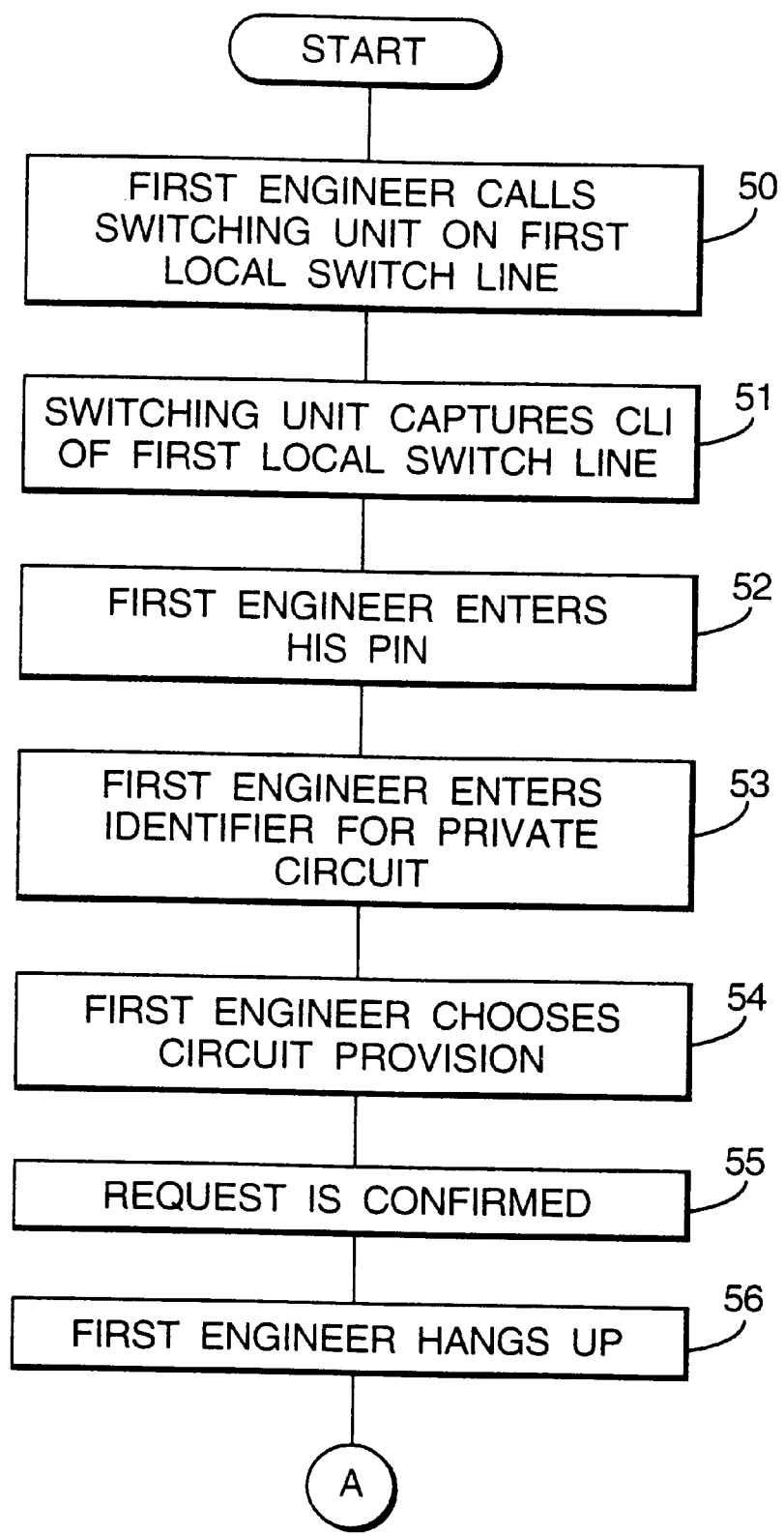

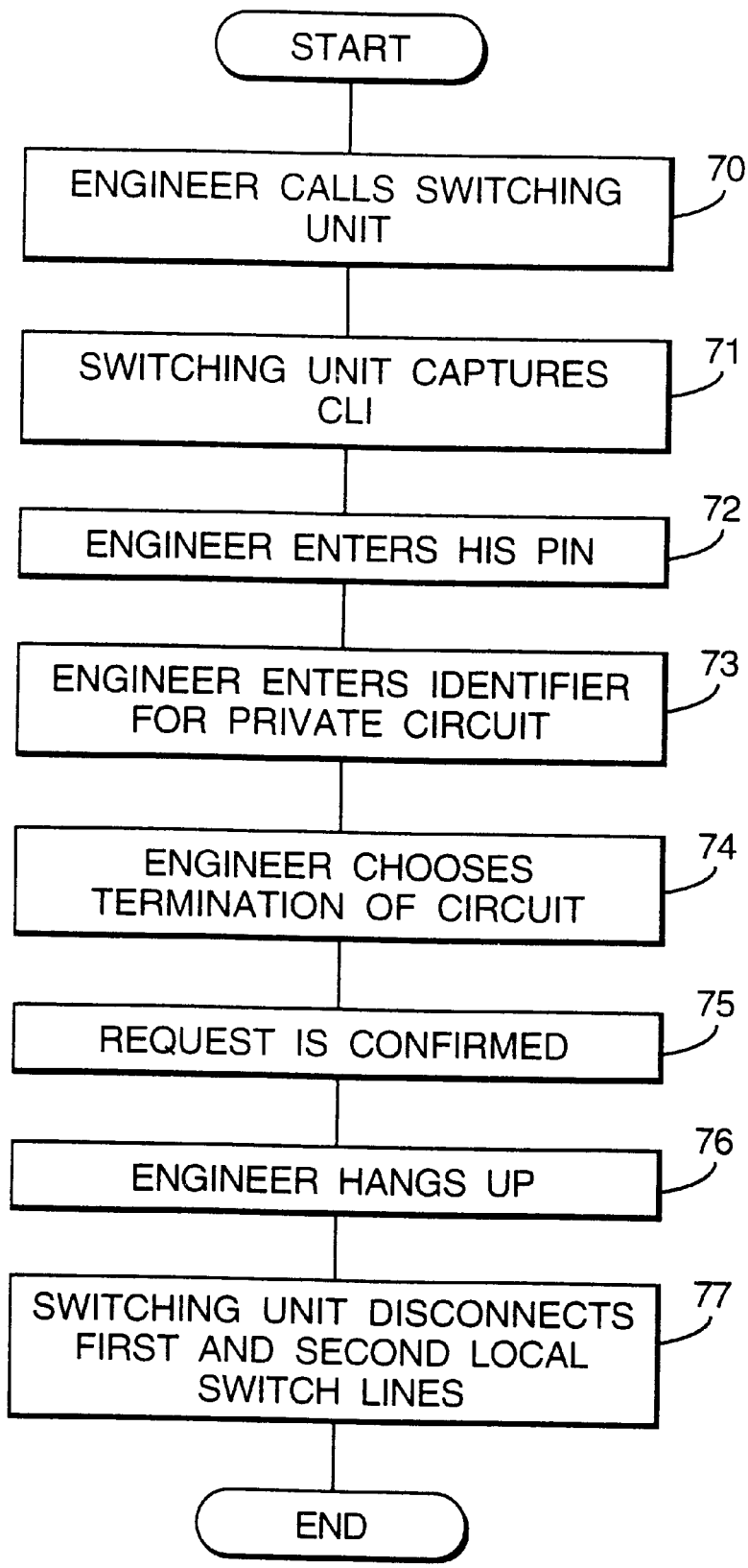

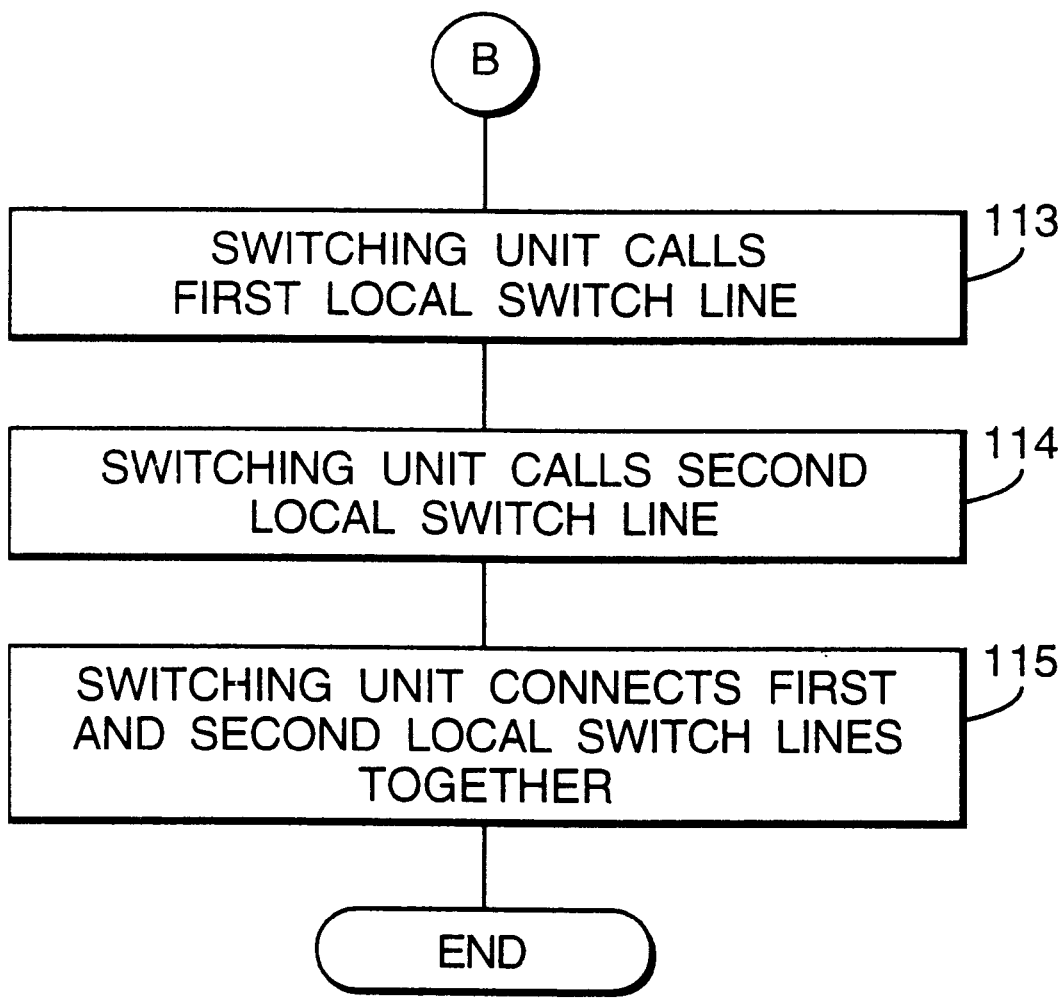

PRIVATE CIRCUIT PROVISION IN A TELECOMMUNICATIONS NETWORK

RELATED APPLICATION

This application is related to copending commonly assigned application Ser. No. 09/043,420 filed Mar. 19, 1998.

BACKGROUND OF THE INVENTION

This invention relates to a method of providing a private circuit in a telecommunications network which has at least two local switches, each local switch having a group of local switch lines and being associated with a group of access lines. The invention is also concerned with such a network which is arranged to provide a private circuit.

Related Art

In the usual method of providing a private circuit between first and second access lines, physical connections are made by engineers at appropriate exchange buildings so as to provide the private circuit. Where a failure occurs in the private circuit in the network, it is a usual requirement to restore the private circuit quickly. There is also sometimes a requirement to provide a private circuit quickly. This invention is concerned with the quick provision or restoration of a private circuit.

A known method of providing quick provision or restoration of a private circuit between a first access line associated with a first local switch and a second access line associated with a second local switch is as follows. At the first local switch, an engineer connects the first access line to a first local switch line. A second engineer then connects the second access line to a second local switch line at the second local switch. The two engineers then instruct network management personnel to provide a permanent switched circuit between the first and second local switch lines through appropriate switches in the network. This known method suffers from the disadvantage that it involves network management personnel so it tends to be laborious and time consuming.

SUMMARY OF THE INVENTION

EP-A-0 400879 describes a dynamic shared facility system for private networks.

According to one aspect of this invention, there is provided a method of providing a private circuit in a telecommunications network, said network having at least two local switches and a switching unit, each local switch having a group of local switch lines and being associated with a group of access lines, said method comprising the steps of:

physically connecting a first access line to a first local switch line at a first local switch;

physically connecting a second access line to a second local switch line at a second local switch;

instructing said switching unit to form a connection between said first and second local switch lines;

said switching unit calling said first local switch line;

said switching unit calling said second local switch line; and said switching unit forming a connection between said first and second local switch lines with itself so as to form a private circuit between said first and second access lines.

In comparison with the known method of quick provision or restoration of a private circuit, the method of the invention has the advantage that it does not involve network management personnel. Consequently, the private circuit can be provided more quickly.

According to a second aspect of this invention there is provided a telecommunications network having at least two local switches and a switching unit, each local switch having a group of local switch lines and being associated with a group of access lines, each access line being connectable to a local switch line, said switching unit comprising:

means for receiving an instruction to form a connection between a first local switch line and a second local switch line to form a private circuit; and means for forming a connection between a first local switch line and a second local switch line within itself to form a private circuit.

BRIEF DESCRIPTION OF THE DRAWINGS

This invention will now be described in more detail, by way of example, with reference to the drawings in which:

FIG. 2 is a block diagram of a local switch and an associated distribution frame located at an exchange building and forming part of the network of FIG. 1;

FIG. 3 is a block diagram of a switching unit forming part of the network of FIG. 1;

FIGS. 4A–4C provide a flow chart of the steps which are used to provide a private circuit in the network of FIG. 1 using the switching unit in one embodiment of this invention;

FIG. 5 is a flow chart of the steps which are used in the network of FIG. 1 to disconnect a private circuit which has been formed using the switching unit; and FIGS. 6A–6C provide a flow chart of the steps which are used to provide a private circuit in the network of FIG. 1 using the switching unit in another embodiment of this invention.

DETAILED DESCRIPTION OF EXEMPLARY EMBODIMENTS

Figure 1:
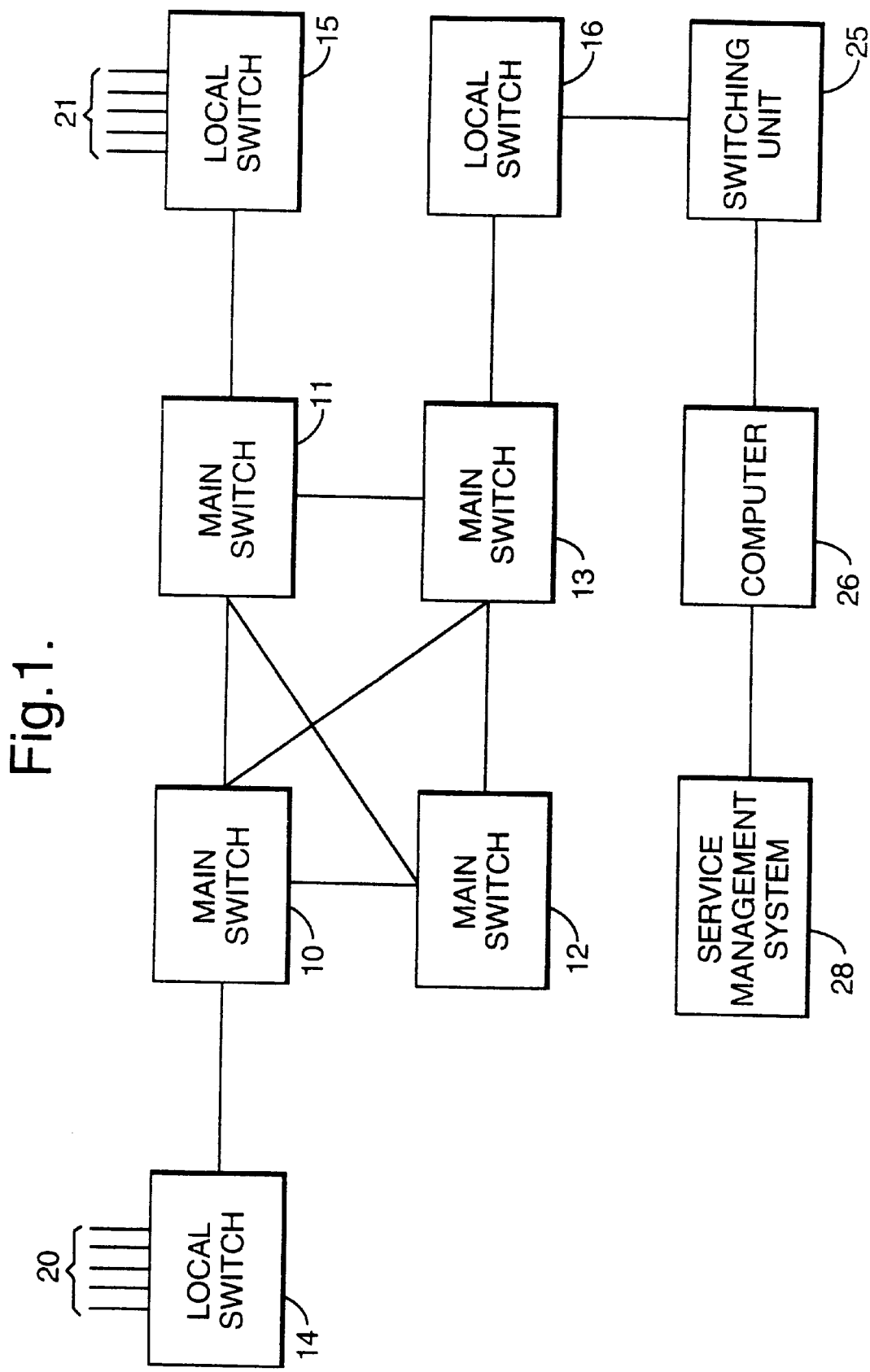
FIG. 1 is a block diagram of a telecommunications network embodying this invention.

Referring now to FIG. 1, there are shown some of the components of a public telecommunications network. As shown in FIG. 1, these components include four fully-interconnected main switches 10, 11, 12, 13 and three local switches 14, 15, 16. Each switch is located at a respective exchange building.

The local switches 14, 15 and 16 are connected, respectively, to main switches 10, 11 and 13. For reasons of simplicity, FIG. 1 shows only four main switches and three local switches. However, in a typical public telecommunications network there would be a much larger number of both main switches and local switches. For example, BT's UK public telecommunications network has more than 60 main switches.

Each of the local switches is associated with a group of access lines, typically several thousand access lines. Each access line is formed from a pair of copper wires and the end of each access line which is remote from the associated local switch is connected to terminal equipment belonging to a user of the network. Some of the access lines 20, 21 associated with local switches 14, 15 are illustrated in FIG. 1.

The public telecommunications network shown in FIG. 1 is capable of providing both switched connections and private circuit connections between access Fines. The switched connections are formed, in a well known manner, by using the switching capabilities of the local and main switches. A private circuit between two access lines at different local switches is normally created by making physical connections at exchange buildings lying on a path which connects the two access lines. As will be described in more detail below, the network shown in FIG. 1 also provides an alternative and faster method of providing a private circuit between two access lines which are associated with two different local switches. In this method, the private circuit is formed without making physical connections at exchange buildings between the two switches associated with the access lines.

This alternative method is useful where a private circuit is required at very short notice or where it is required to restore a private circuit quickly after a fault has occurred.

The network of FIG. 1 also includes a switching unit 25 and an associated computer 26. The switching unit 25, as will be described in detail below, is used in the alternative method of providing a private circuit.

The network of FIG. 1 also includes a service management system 28 which takes the form of a computer. The service management system 28 receives orders and fault reports from users of the network. Although not forming part of the present invention, and not illustrated in FIG. 1, the service management system 28 is capable of sending instructions to the switches to provide circuits to meet orders from the users of the network and also to take appropriate action to correct faults.

Each of the switches 10 to 13 and 14 to 16 shown in FIG. 1 is a System X switch manufactured by GEC Plessey Telecommunications Ltd. The main components of a local switch 14 are illustrated in FIG. 2 and these components will now be described.

Referring now to FIG. 2, the local switch 14 is located at an exchange building indicated by a dashed line 15. At the exchange building 15, each of the access lines 20 is connected to a respective terminal on the input side of a distribution frame 30. The switch 14 includes a bank of line cards 31. The input terminal of each line card is connected to a respective terminal on the output side of the distribution frame 30. The output terminals of the line card 31 are connected to input terminals of a concentrator 32 and the output of concentrator 32 is connected to a processor 33.

The input terminals of the line cards 31 represent the inputs to the local switch lines of the local switch 14. In order to connect one of the access lines 20 to a local switch line, a physical connection is made between the terminal on the input side of the distribution frame 30 to which the access line is connected and one of the terminals on the output side of the distribution frame 30.

In the present example, the switching unit 25 is implemented as a computer provided with switching capability.

Referring now to FIG. 3, the components of switching unit 25 comprise a central processing unit (CPU) 40, a video display unit (VDU) 41, a keyboard 42, input/output ports 43, a switch processor 44 which provides the switching capability, a store 45 and signal processing cards 46. The signal processing cards include a speech synthesiser card, a dual tone multi-frequency detector card and a dual tone multi-frequency generator card. The input/output ports 43 connect the switching unit 25 to the local switch 16 via a 30 channel integrated services digital network (ISDN) communications link and also to computer 26.

The store 45 is formed from hard disk memory, read only memory (ROM) and random access memory (RAM). The store 45 contains the program for controlling the switching unit 25.

A switching unit of the type shown in FIG. 3 is available from Aculab plc of Lakeside, Bramley Road, Mount Farm, Milton Keynes under the name Millennium Conn.

As will be described in more detail below, in order to provide a private circuit between two access lines, for example one of the access lines 20 and one of the access lines 21, each of the access lines is connected at its local switch to a local switch line. The local switch lines are then connected to each other via the switching unit 25. One embodiment of the series of operations which are used to provide a private circuit will now be described with reference to FIGS. 4A–4C.

In this embodiment, when a decision is made to create a private circuit, details of the private circuit to be formed including identifiers for the access lines which are to be connected and an identifier for the private circuit are entered in the service management system 28. The service management system 28 supplies the identifier for the private circuit and identifiers for the two access lines to the computer 26.

Then, a first engineer makes a physical connection between the first access line and a first local switch line at the local switch for that access line. A second engineer makes a physical connection between the second access line and a second local switch line at the local switch line for that access line.

Next, in step 50, the first engineer calls the switching unit 25 on the first local switch line. He may do this either by dialling the full telephone number of the switching unit 25 or by dialling a short code which is translated in the local switch to the full telephone number.

In the telecommunications network shown in FIG. 1, the calling line identity (CLI) of a calling local switch line is transmitted at the beginning of each call to the called line. The calling line identity is also transmitted in the signalling channel of a 30 channel ISDN link. Thus, at the beginning of a call, terminal equipment attached to the end of a single line or the end of a 30 channel ISDN link can retrieve the calling line identity of the calling line. In step 51, the switching unit 25 captures the CLI of the first local switch line.

The switching unit 25 then transmits a speech message to the first local switch line inviting the engineer to enter his personal identification number (PIN). In step 52 the first engineer enters his PIN on his handset.

The switching unit 25 then transmits a speech message to the first local switch line inviting the engineer to enter the identifier for the private circuit. The engineer then enters the identifier in a step 53.

Then, the switching unit 25 transmits a speech message to the first local switch line inviting the engineer to choose between circuit provision and circuit termination. For each option, it specifies a digit which is to be entered which may be, for example, "one" for circuit provision and "two" for circuit termination. Then, in a step 54, the engineer enters the digit for circuit provision.

The switching unit 25 then transmits a speech message to the first local switch line confirming the details which have been received and inviting the first engineer to enter a digit to indicate his agreement with the details. In step 55, the first engineer enters this digit. Then, in step 56, the first engineer hangs up.

The second engineer then performs a similar series of operations. Specifically, in step 57, the second engineer calls the switching unit 25 on the second local switch line. In step 58, the switching unit 25 captures the CLI of the second local switch line.

In step 59, the second engineer enters his PIN. In step 60, the second engineer enters the identifier for the private circuit which is to be created. In step 61, the second engineer chooses circuit provision and, in step 62, the second engineer confirms the details of the request for a private circuit. In step 63, the second engineer hangs up.

The switching unit 25 then asks the computer 26 to verify that the identifier for the private circuit which it has received from the first and second engineers corresponds to an identifier for a private circuit which the computer 26 has received from the service management system 28. If the identifier is verified, the switching unit 25 calls the first local switch line in a step 64 and the second local switch line in a step 65. As a result of performing steps 64 and 65, the switching unit 25 has formed a connection to each of the first and second local switch lines. Two ISDN channels are used for each connection.

Lastly, in a step 66, the switching unit 25 forms a connection within itself between the first and second local switch lines. As a result of doing this, a private circuit is formed between the first and second access lines.

Figure 4B:
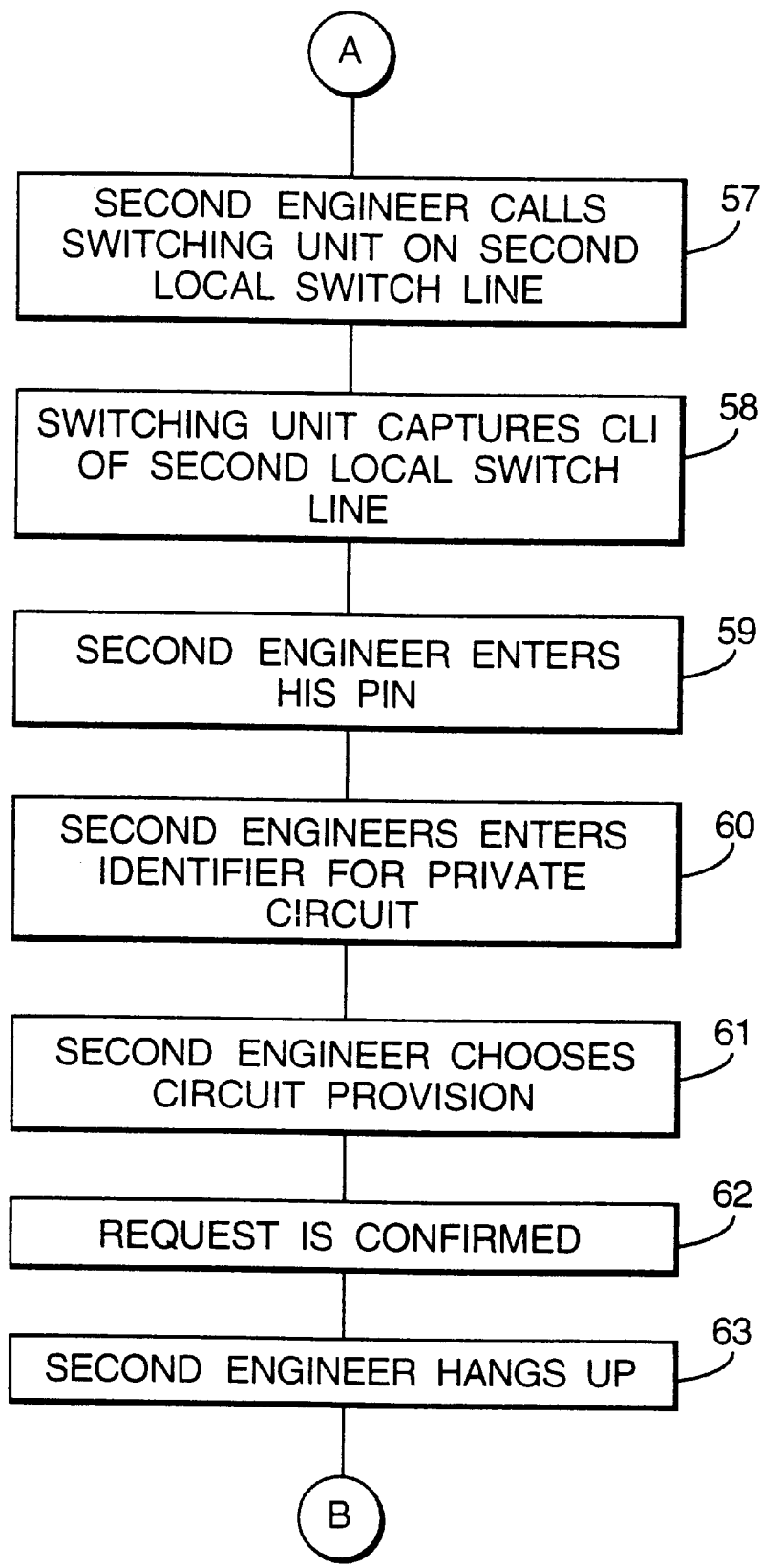
Figure 4C:
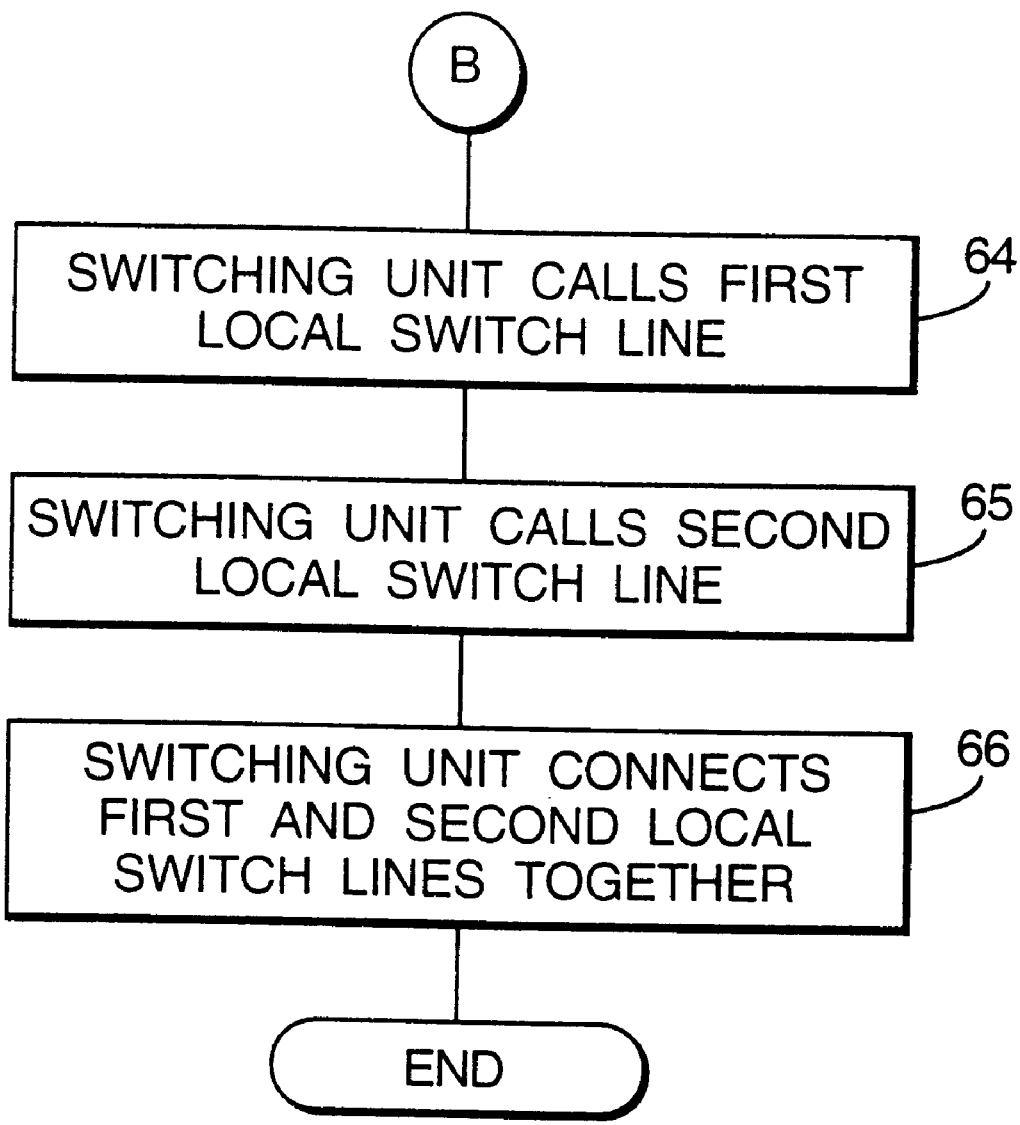

As may be readily appreciated, when a private circuit is formed using the steps set out in FIGS. 4A–4C, the private circuit may be created very quickly.

The series of operations which are used to terminate a private connection formed through the switching unit 25 are shown in FIG. 5 and these will now be described.

In order to terminate a private circuit, initially an engineer calls the switching unit 25 in a step 70. Then, in a step 71, the switching unit 25 captures the CLI of the calling line. In step 72, the engineer enters his PIN and, in step 73, the engineer enters the identifier for the private circuit which is to be terminated.

The switching unit 25 then issues a speech message to the engineer inviting him to choose circuit provision or circuit termination and specifies a digit which is to be entered for each option. In step 74, the engineer enters the digit for circuit termination.

The switching unit 25 then issues a speech message to the calling line setting out the details of the request to terminate a private circuit and asking the engineer to enter a specified digit to confirm the request. In a step 75, the engineer enters this digit and, in step 76, the engineer hangs up.

Then, in step 77, the switching unit 25 breaks the termination within itself between the first and second local switch lines which have been used to form a connection. It then terminates its call to each of these local switch lines. The switch lines are then physically disconnected from the first and second access lines by engineers in the relevant local exchange buildings.

The switching unit 25 sends details of the private circuits which it connects and disconnects to the computer 26. Specifically, after connecting first and second local switch lines together in steps 66, the switching unit 25 informs the computer 26 of the time of connection, the identifier for the private circuit and the telephone numbers of the first and second local switch lines. After disconnecting first and second local switch lines in step 77, it informs the computer 26 of the time of disconnection, the identifier for the private circuit and the telephone numbers of the first and second local switch lines. As mentioned above for each private circuit, the computer 26 receives identifiers for the first and second access lines together with the identifier for the private circuit from the service management system 28.

The operator of computer 26 can then use the details logged in computer 26 to manage the provision of private circuits using the switching unit 25. In general, a private circuit formed using switching unit 25 will be maintained only until it is possible to replace it with a private circuit which is created by forming physical connections in the switches along a path between the two access lines which are to be connected.

As mentioned above, the switching unit 25 is connected to the local switch 16 by a 30 channel ISDN link. Consequently, the switching unit 25 may used to provide fifteen 64 kilobit/s private circuits. If it is desired to use it to provide a greater number of 64 kilobit/s private circuits, this may be achieved by providing additional 30 channel links between local switch 16 and switching unit 25. If it desired to use the switching unit 25 to provide 30 channel ISDN private circuits, this may be achieved by providing a 30 channel ISDN link between local switch 25 and switching unit 25 for each such private circuit.

Figure 6A:
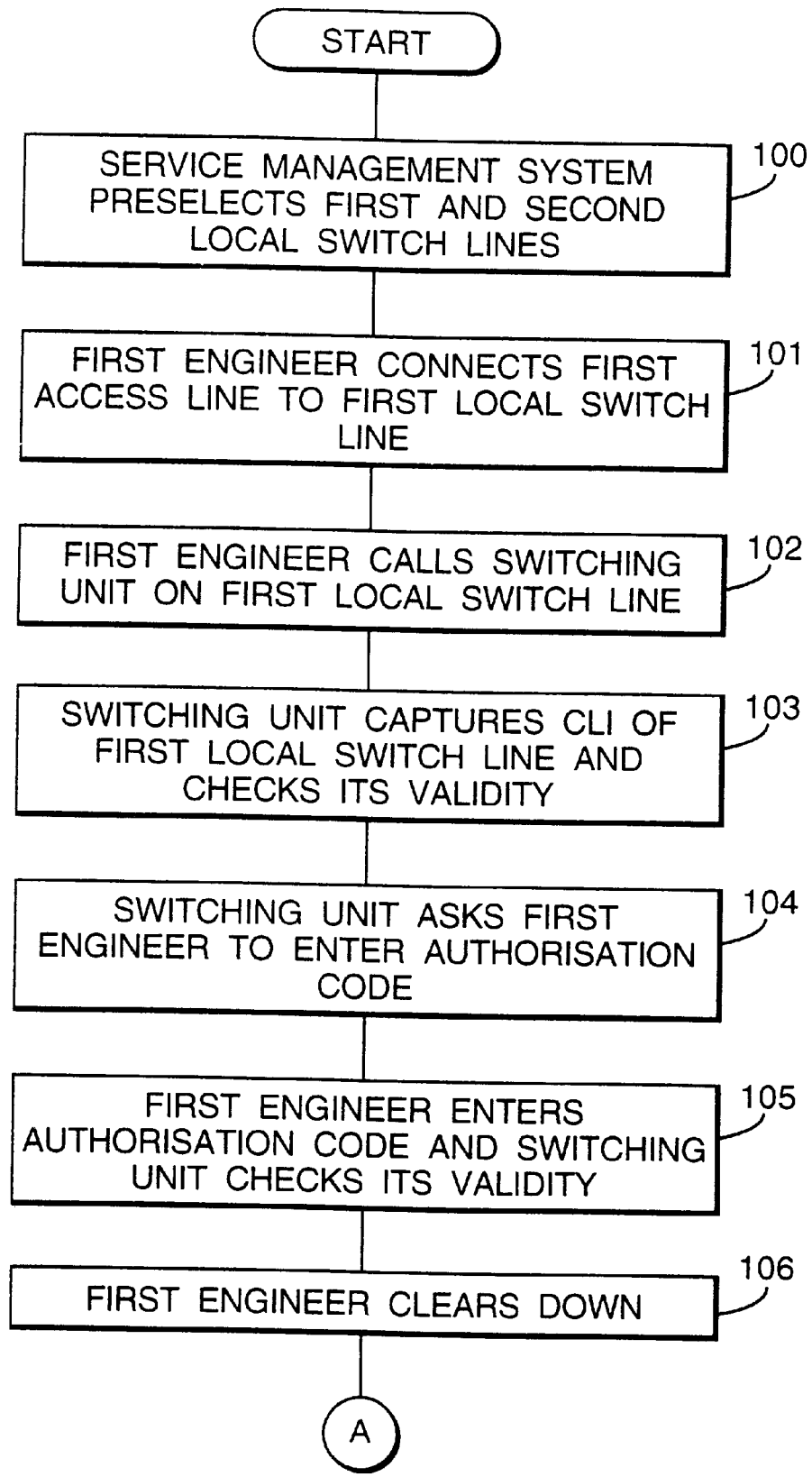
Figure 6B:
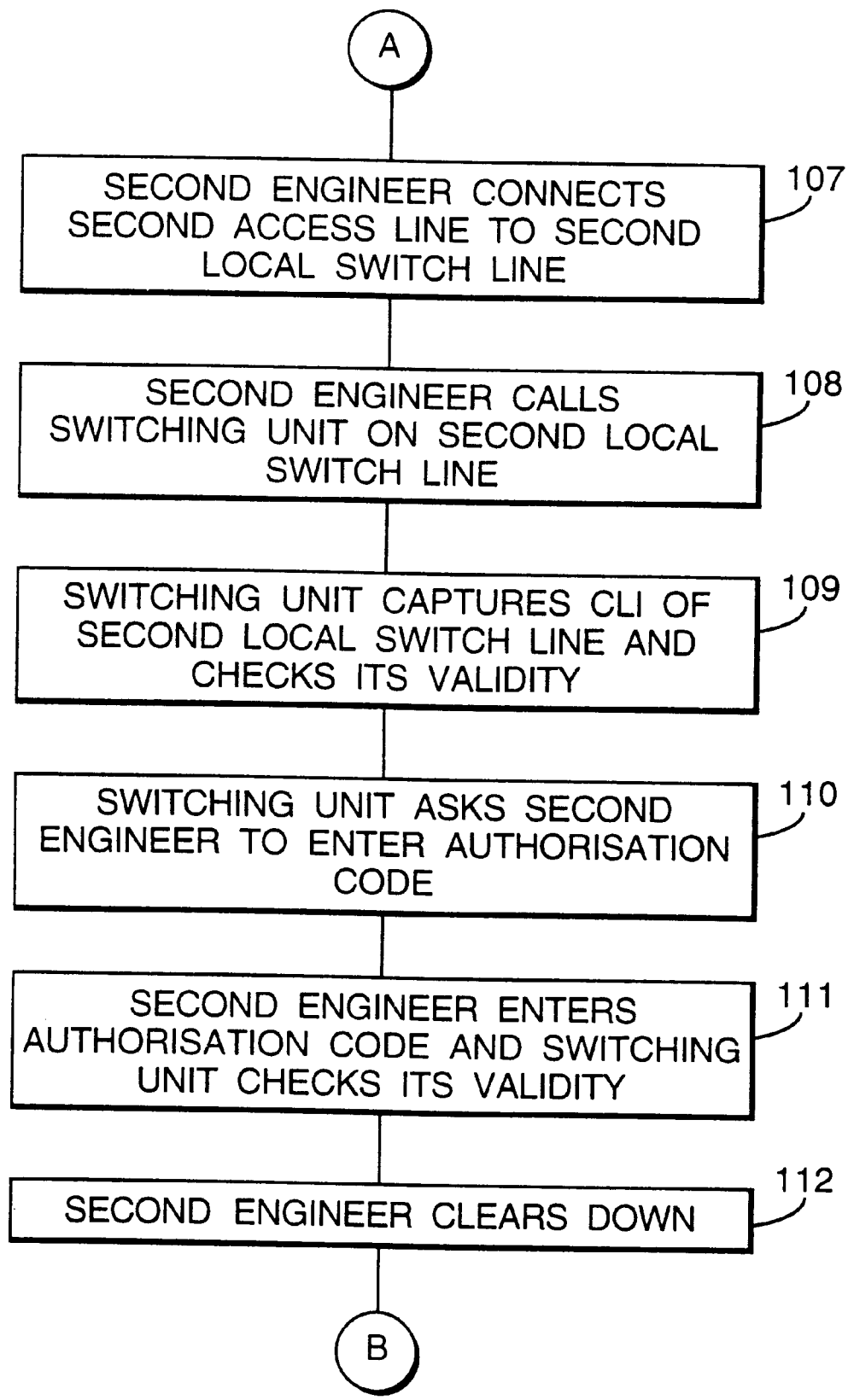

An alternative embodiment of the series of operations which are used to provide a private circuit will now be described with reference to FIGS. 6A–6C.

In this embodiment, when a decision is made to create a private circuit, in a step 100, the first and second local switch lines are preselected by the service management system 28. The service management system also creates an authorisation code or identifier for the private circuit. The numbers of the preselected first and second local switch lines and the authorisation code are sent to the first and second engineers at the first and second local switches. The service management system also supplies the numbers of the first and second local switch lines and the authorisation code to the computer 26 for use by the switching unit 25.

Next, in a step 101, the first engineer connects the first access line to the first local switch line. Then, in a step 102, the first engineer calls the switching unit 25 on the first local switch line.

In a step 103, the switching unit captures the CLI of the first local switch line and checks its validity. If it is not valid, the switching unit clear down the line. If the CLI is valid, in a step 104 the switching unit 25 ask the first engineer to enter the authorisation code. In a step 105, the first engineer enters the authorisation code and the switching unit 25 checks its validity. If the authorisation code is not valid, the switching unit clears down the line. If the authorisation code is valid, the switching unit informs the first engineer that the details of the first leg of the private circuit are confirmed and it invites the first engineer to hang up. The first engineer hangs up in a step 106.

In a series of steps 107 to 112, the second engineer performs a series of operations which are similar to the operations performed by the first engineer and described with reference to steps 101 to 106.

Then, the switching unit 25 calls the first local switch line in a step 113 and the second local switch line in a step 114. Lastly, in a step 115, the switching unit forms a connection within itself between the first and second local switch lines, thereby forming a private circuit between the first and second access lines.

In this embodiment, in order to terminate a private circuit, the service management system 26 instructs the switching unit 25 to terminate the private circuit. On receipt of such an instruction, the switching unit breaks the connection within itself between the first and second local switch lines and then terminates its call to each of the local switch lines.

What is claimed is:

1. A method of providing a private circuit in a telecommunications network, said network having at least two local switches and a switching unit, each local switch having a group of local switch lines and being associated with a group of access lines, said method comprising the steps of:

physically connecting a first access line to a first local switch line at a first local switch;

physically connecting a second access line to a second local switch line at a second local switch;

instructing said switching unit to form a connection between said first and second local switch lines;

said switching unit calling said first local switch line;

said switching unit calling said second local switch line; and said switching unit forming a connection between said first and second local switch lines with itself so as to form a private circuit between said first and second access lines, wherein said step of instructing said switching unit to connect said first and second access lines comprises the steps of:

a first user calling said switching unit on said first local switch line;

said switching unit capturing the calling line identity of said first local switch line;

a second user calling said switching unit on said second local switch line; and said switching unit capturing the calling line identity of said second local swithc line.

2. A method as in claim 1 wherein said step of instructing said switching unit to connect said first and second access lines further comprises the steps of:

said first user entering an identifier for said private circuit on said first local switch line; and said second user entering said identifier for said private circuit on said second local switch line.

3. A method of providing a private circuit in a telecommunications network, said network having at least two local switches and a switching unit, each local switch having a group of local switch lines and being associated with a group of access lines, said method comprising the steps of:

physically connecting a first access line to a first local switch line at a first local switch;

physically connecting a second access line to a second local switch line at a second local switch;

instructing said switching unit to form a connection between said first and second local switch lines;

said switching unit calling said first local switch line;

said switching unit calling said second local switch line; and said switching unit forming a connection between said first and second local switch lines with itself so as to form a private circuit between said first and second access lines;

wherein said step of instructing said switching unit to connect said first and second access lines comprises the steps of:

a first user calling said switching unit on said first local switch line;

said switching unit capturing the calling line identity of said first local switch line;

said first user entering an identifier for said private circuit on said first local switch line;

a second user calling said switching unit on said second local switch line;

said switching unit capturing the calling line identity of said second local switch line; and said second user entering said identifier for said private circuit on said second local switch line.

4. A method as claimed in claim 3, comprising the further steps of:

said first user entering a request to provide a private circuit; and said second user entering a request to provide a private circuit.

5. A method as claimed in claim 3, comprising the further steps of:

preselecting said first and second local switch lines;

after capturing the calling line identity of the first local switch line, said switching unit checking its validity; and after capturing the calling line identity of the second local switch line, said switching unit checking its validity.

6. A method of disconnecting a private circuit which has been provided by the method of any one of the preceding claims, said method comprising the steps of:

a user calling said switching unit;

said user entering an identifier for said private circuit;

said user entering a request for disconnection of said private circuits; and said switching unit breaking the connection within itself between said first and second local switch lines.

7. A telecommunications network having at least two local switches and a switching unit, each local switch having a group of local switch lines and being associated with a group of access lines, each access line being connectable to a local switch line, said switching unit comprising:

means for receiving an instruction to form a connection between a first local switch line to a second local switch line to form a private circuit;

means for calling a first local switch line;

means for calling a second local switch line; and means for forming a connection between a first local switch line and second local switch line within itself to form a private circuit, wherein said means for receiving an instruction comprises:

means for receiving a call on a first local switch line;

means for capturing the calling line identity of said first local switch line;

means for receiving a call on a second local switch line; and means for capturing the calling line identity of said second local switch line.

8. A telecommunications network as in claim 7 wherein said means for receiving an instruction further comprises:

means for receiving an identifier for a private circuit on said first local switch line; and means for receiving said identifier for said private circuit on said second local switch line.

9. A telecommunications network having at least two local switches and a switching unit, each local switch having a group of local switch lines and being associated with a group of access lines, each access line being connectable to a local switch line, said switching unit comprising:

means for receiving an instruction to form a connection between a first local switch line to a second local switch line to form a private circuit;

means for calling a first local switch line;

means for calling a second local switch line; and means for forming a connection between a first local switch line and a second local switch line within itself to form a private circuit, wherein said means for receiving an instruction comprises:
  means for receiving a call on a first local switch line;
  means for capturing the calling line identity of said first local switch line;
  means for receiving an identifier for a private circuit on said first local switch line;
  means for receiving a call on a second local switch line;
  means for capturing the calling line identity of said second local switch line; and
  means for receiving said identifier for said private circuit on said second local switch line.

* * * * *